United States Patent
Schilling et al.

(10) Patent No.: US 7,021,013 B1
(45) Date of Patent: Apr. 4, 2006

(54) COMPENSATOR FOR COMPENSATING THERMAL EXPANSIONS

(75) Inventors: Horst Schilling, Cologne (DE); Ralf Filges, Bergisch Gladbach (DE)

(73) Assignee: KHD Humboldt Wedag AG, Cologne (DE)

( * ) Notice: Subject to any disclaimer, the term of this patent is extended or adjusted under 35 U.S.C. 154(b) by 0 days.

(21) Appl. No.: 09/913,473

(22) PCT Filed: Feb. 10, 2000

(86) PCT No.: PCT/EP00/01098

§ 371 (c)(1),
(2), (4) Date: Oct. 9, 2001

(87) PCT Pub. No.: WO00/47926

PCT Pub. Date: Aug. 17, 2000

(30) Foreign Application Priority Data

Feb. 11, 1999 (DE) .......................... 199 05 649

(51) Int. Cl.
*E04H 12/28* (2006.01)

(52) U.S. Cl. ............................ 52/219; 52/220.8; 52/232
(58) Field of Classification Search ............... 52/218, 52/219, 220.8, 232
See application file for complete search history.

(56) References Cited

U.S. PATENT DOCUMENTS 4,894,966 A * 1/1990 Bailey et al. ............. 52/317
5,105,592 A * 4/1992 MacMillan et al. ........... 52/232
5,311,715 A   5/1994 Linck et al.
5,351,448 A * 10/1994 Gohlke et al. .................. 52/1
5,548,934 A * 8/1996 Israelson ................... 52/220.8

FOREIGN PATENT DOCUMENTS

EP        0681097       2/1995
WO    WO 89/03001       4/1989

* cited by examiner

*Primary Examiner*—Carl D. Friedman
*Assistant Examiner*—Yvonne M. Horton
(74) *Attorney, Agent, or Firm*—Charles L. Schwab; Nexsen Pruet Jacobs & Pollard, LLC

(57) ABSTRACT

A compensator (18) is provided for compensating thermal expansions of ducts or pipelines (10) for carrying flows of hot media, especially ducts that are lined with fire-proof material. The compensator (18) is easy to maintain and is relatively simple in its design. This compensator (18) permits inspection of the operability of the expansion gap (19) between adjacent sections of the pipeline (10) and its elastic temperature-resistant jointing material (20) from the outside of the pipeline. The expansion gap (19) in the flame-proof lining is arranged in a cross section plane of the pipeline that is adjacent to but below the cross section plane of the corrugated pipe compensator (18) attached to the steel sheet jackets (15) of adjacent sections of pipeline (10). The steel sheet jackets (15) are spaced from one another in the area of the expansion gap (19) and the elastic temperature-resistant jointing material (20) is easily accessible from outside the pipeline upon removal of jacket parts (21) forming a collar around the expansion gap (19).

9 Claims, 1 Drawing Sheet

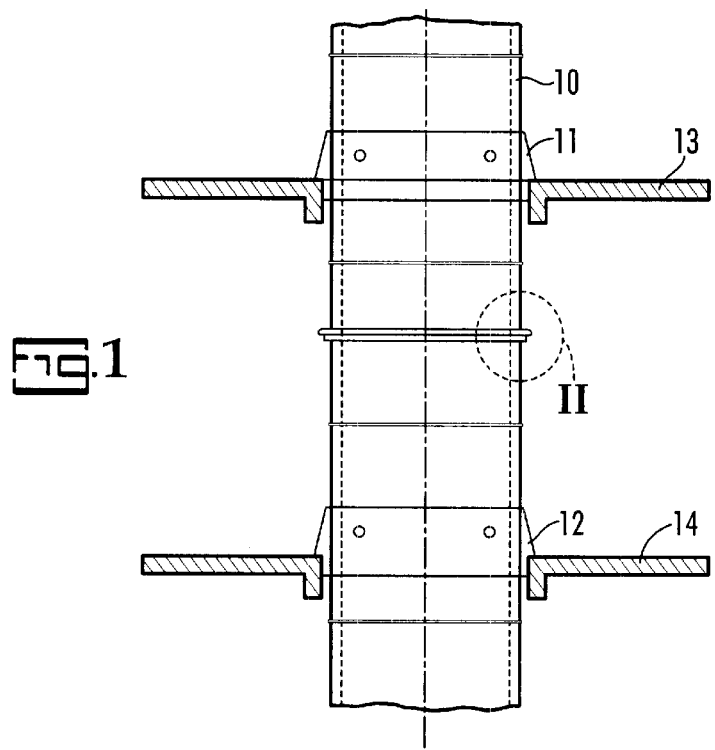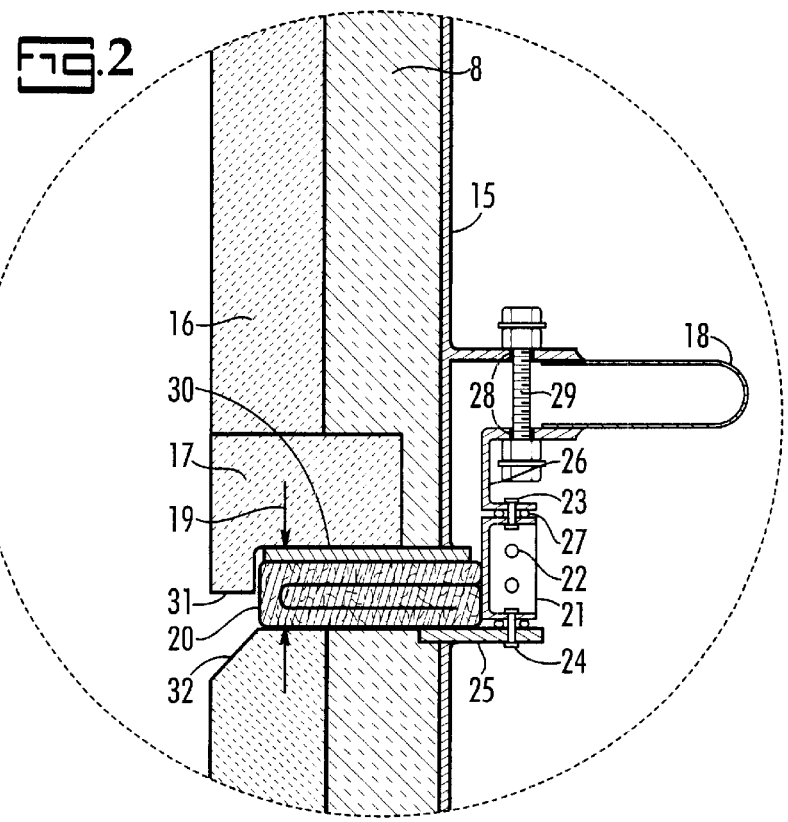

COMPENSATOR FOR COMPENSATING THERMAL EXPANSIONS

This invention relates to a compensator for compensating thermal expansions of pipelines conveying hot flowing media, in particular refractory-lined off-gas lines of systems for the manufacture of cement clinker from cement raw meal. The compensator includes a corrugated pipe built into the sheet-steel jacket of the pipeline and an expansion gap in the refractory lining, which is filled by a temperature-stable elastic jointing material.

BACKGROUND OF THE INVENTION

Systems for the manufacture of cement clinker from cement raw meal have a rotary kiln and, connected upstream thereof as viewed in the direction of material flow, a cyclone suspension heat exchanger with a calcinator. Many pipelines that convey hot media in a cement manufacturing plant are subject to thermal expansion. For instance the gas riser pipeline in the calcinator stage may convey a 850° C. suspension of rotary kiln off-gas, hot meal, fuel and possibly also clinker cooler off-gas as the tertiary air flows upwardly from below. Such thermally severely stressed pipelines must be lined with refractory material.

In order to compensate for thermal expansions of such thermally severely stressed pipelines, which are often in an approximately vertical position or suspended in tall building structures, it is known to build compensators into the pipelines. The compensator must be able to compensate, first, for the differing expansions of the sheet-steel jacket of the pipeline and the supporting building and, second, for the differing expansions of the sheet-steel jacket and the refractory lining of the pipeline. If the expansion compensator is inadequate, the supporting consoles or brackets of a pipeline in the upper region of the cyclone suspension heat exchanger building may no longer rest on the platform structure of the building, which can lead to uncontrollable and critical loadings of the building as well as the pipelines and connectors conveying the hot media.

One reason for the functioning failure of prior compensators is that in the course of time the fine-grained solid conveyed in the hot suspension, for example hot cement raw meal and/or other aggressive media, can move from the interior into the expansion gap of the refractory lining, which heretofore has been arranged in the plane of the metallic compensating corrugated pipe. From there the media can penetrate into the temperature-stable jointing material serving as an elastic seal, causing the jointing material, to harden and lose its elasticity. Heretofore such hot-gas pipelines in the region of the compensator from time to time, by inserting scaffolds into the pipeline in order that the compensator and in particular the expansion gap can be inspected and serviced from inside, which, entails a considerable expenditure for the costs of the scaffold as well as the labor. International application publication WO 89/03001 published Apr. 6, 1989 entitled Fabric Expansion Joints for Exhaust Systems for Gas Turbines, uses a composite fabric belt to interconnect duct sections which must be removed to access the joint packing.

OBJECTS AND SUMMARY OF THE INVENTION

It is therefore an object of the invention to provide a compensator, for the compensation of thermal expansions of refractory-lined pipelines conveying hot flowing media which is relatively inexpensive, is easily serviced without requiring inspection and servicing of the expansion gap and its jointing material from inside the pipeline.

An important characteristic of the compensator of the expansion joint of this invention is that the expansion gap for the refractory lining between adjacent sections of the pipeline into which the compensator is built is no longer arranged in the cross-sectional plane of the corrugated pipe compensator. Instead, the compensator lies adjacent to that cross-sectional plane. The expansion joint includes a circumferentially segmented band or collar positioned between the compensator and the lower section of the pipeline. The segmented collar encircles the gap in the refractory lining of the adjacent pipeline sections and when the segmented collar is removed, the elastic, temperature-stable jointing material of the expansion gap is conveniently accessible from the outside of the pipeline for purposes of inspection and, if necessary, renewal of the elastic jointing material. In the case of an approximately vertically arranged hot-gas pipeline such as, the rotary kiln off-gas pipeline of a cement clinker production line, through which a hot gas suspension flows upwardly from below, the cross-sectional plane of the expansion gap for the refractory lining is advantageously arranged below the cross-sectional plane of the corrugated pipe compensator for the sheet-steel jacket. Thus the interior of the corrugated pipe compensator remains free of dust.

In order to facilitate the assembly/disassembly of the circumferentilly segmented collar, the corrugated pipe compensator has circumferentially spaced holes in its radially inwardly placed region parallel to the pipeline axis, through which threaded bolts are inserted. By tightening these bolts, the corrugated pipe compensator is contracted in a clamping manner. The removal and installation of the segmented collar segments is facilitated through use of this clamping device.

BRIEF DESCRIPTION OF THE DRAWINGS

The invention and its further features and advantages are explained in more detail on the basis of the exemplary embodiment illustrated in the drawings in which:

FIG. 1 is a sectional view of a refractory-in lined hot gas pipeline of a cement clinker production line, installed vertically in a tall, multistory building having a plurality of platforms, with an expansion joint for compensating thermal expansions and FIG. 2 is a sectional view of the expansion joint.

DETAILED DESCRIPTION

FIG. 1 shows a refractory-lined pipeline 10 through which a hot gas suspension with rotary kiln off-gas at a temperature of, for example, 800° C. flows. The pipeline 10 is installed by brackets 11 and 12 in a plurality of platforms 13, 14 of a tall building structure. In order to compensate thermal expansions of the pipeline 10, an expansion joint with a compensator, shown in detail in FIG. 2, is built into the pipeline at a location between the platforms 13 and 14.

As FIG. 2 shows, the hot gas pipeline 10 of FIG. 1 has a sheet-steel jacket 15, which can have a round, right-angled, square or polygonal cross section. The sheet-steel jacket 15 is lined with refractory bricks 16, 17, or the like, and with temperature-stable insulation 18. An expansion joint is provided for confronting ends of in-line sections of the pipeline 10 which includes a metallic corrugated pipe compensator 18 between the sheet-steel jackets 15 of the confronting pipeline sections. A temperature-stable elastic jointing material forms an elastic fiber mat or sealing washer 20 in the expansion gap between confronting ends of refractory lining of the in-line pipeline sections.

According to the invention, the expansion gap 19 for the refractory lining is arranged in a pipeline cross-sectional plane that is spaced from the cross-sectional plane of the corrugated pipe compensator 18 of the expansion joint. As shown in FIG. 2, the cross-sectional plane of the expansion gap 19 lies adjacent to but below the cross-sectional plane of corrugated pipe compensator 18. The expansion joint includes a collar made up of a plurality of U-profile jacket parts 21 which open outwardly in cross section. The U-profile segments or jacket parts 21 include connector walls 22 with holes for receiving releasable fasteners holding the jacket parts 21 in assembly. Releasable connectors 24 connect the jacket parts 21 of the collar to an outwardly projecting flange 25 of the sheet-steel jacket 15 of the bottom pipeline section. Releasable connectors 23 connect the jacket parts 21 to a U-section band 26 disposed between the compensator 18 and the collar formed by jacket parts 21.

According to the invention, expansion gap 19 with elastic jointing material 20 is inspected or serviced in the following way: after detachable connectors 23 and 24 have been released, the U-profile jacket parts 21, on the lateral bounding walls of which packing cords 27 may be arranged, are removed, after which the expansion gap and the jointing material 20 are conveniently accessible from outside.

The top flange of the corrugated compensator 18 is secured to the jacket 15 of the upper section of the pipeline and the lower flange of the corrugated compensator 18 is releasably secured to the band 26 encircling the pipeline 10.

Circumferentially spaced through holes 28 are distributed about the circumference of and lie transverse to the pipe corrugation of the corrugated compensator 18, that is, parallel to the pipeline jacket axis. Threaded bolts 29 are installed in the holes 28 and, when tightened, provide a clamping device by which the pipe corrugation of the corrugated pipe compensator 18 can be pulled together. In this way, the band 26 attached to the lower flange of corrugated compensator 18 is pulled upwardly so that the assembly/disassembly of detachably connected U-profile jacket parts 21 is facilitated.

The expansion gap 19 for the refractory lining is bounded above by a brick supporting flange 30 mounted on sheet-steel jacket 15 for the support of refractory lining 17, etc., which lining can have, in its expansion gap region facing the interior of the pipeline, a nose 31 extending downwardly, as viewed in FIG. 2, as a stop for the temperature-stable elastic jointing material or fiber mat 20 inserted into the expansion gap from outside.

At the expansion gap 19 on side 32 opposite stop nose 31, the refractory lining can further have a wedge-shaped outline such that expansion gap 19 expands steadily toward the interior of the pipeline as viewed in cross section in FIG. 2. In this way, dust deposits that settle in this region in the expansion gap of the refractory lining will automatically be squeezed back out of the gap upon thermal expansions of the pipeline.

The hole provided for the threaded bolt 29 in corrugated pipe compensator 18 can also be used for a measurement of the negative pressure prevailing in the interior of the pipeline 10. The level of the measured negative pressure permits inferences as to the condition of the elastic jointing material 20.

The expansion compensator of this invention can be used in other refractory-lined pipelines of a cement clinker facility such as the tertiary air pipelines connecting the clinker cooler with the calcinator of the burning system.

What is claimed is:

1. In a facility for producing cement clinker from raw meal, the combination comprising:
   a pipeline (10) for conveying hot gases having a sheet-steel jacket (15) and a refractory lining, said pipeline (10) having adjacent in-line pipeline sections presenting confronting ends in spaced relation to one another to allow for thermal expansion, thereby creating an expansion gap between said refractory linings and jackets of said confronting ends of said pipeline sections,
   a temperature-stable elastic jointing material (20) in said expansion gap between said refractory linings of said confronting ends of said adjacent pipeline sections and
   a thermal expansion compensator structure around said pipeline (10) including
      a corrugated pipe compensator (18) having axially opposite first and second ends, said first end being secured to the sheet-steel jacket (15) of one said adjacent sections of said pipeline (10), said corrugated pipe compensator (18) lying in a first pipe cross sectional plane spaced from a second pipe cross sectional plane through said gap (19) and
      jacket parts (21) detachably connected to one another to form a circumferentially segmented collar encompassing said pipeline at said gap, one axial side of said collar being detachably connected to said sheet metal jacket of the other of said adjoining pipeline sections and the other axial side of said collar being detachably connected to said second end of said corrugated pipe compensator (18), said sheet steel jacket parts (21) being removable upon detachment from one another, detachment from said corrugated pipe compensator (18) and detachment from said sheet metal jacket (15) of said other of said adjoining pipeline sections thereby permitting access to said elastic jointing material (20) from outside said pipeline (10).

2. The facility as set forth in claim 1 wherein said pipeline (10) extends in an upward direction and said first cross sectional plane is above said second cross sectional plane.

3. The facility as set forth in claim 1 wherein said jacket parts (21) have a U shaped cross section.

4. The facility as set forth in claim 3 wherein said thermal expansion compensating structure includes a first outwardly projecting flange on said one adjacent section of said pipeline (10) and a second outwardly projecting flange (25) on said other adjoining section of said pipeline (10), said first end of said corrugated pipe compensator (18) being secured to said first flange and said one axial side of said collar being detachably secured to said second flange.

5. The facility as set forth in claim 3 wherein said corrugated pipe compensator (18) has, in its radially inwardly placed region, through holes (28) distributed about its circumference and lying transverse to the pipe corrugation and a clamping device passing through said holes (28) operable to axially contract the pipe corrugation of said corrugated pipe compensator (18).

6. The facility as set forth in claim 1 wherein said expansion gap (19) for the refractory lining is bounded by a brick supporting flange (30) mounted on said sheet-steel jacket (15) of said one pipeline section for the support of said refractory lining (17), said refractory lining including a stop nose (31) extending beyond said supporting flange and constituting a stop for the temperature-stable elastic jointing material (20) inserted into said expansion gap from outside.

7. The facility as set forth in claim 6 wherein said refractory lining of said other pipeline section at said expansion gap opposite said stop nose (31) is wedge-shaped so that the expansion gap (19) expands steadily toward the interior of the pipeline.

8. The facility as set forth in claim 1 wherein said elastic jointing material (20) is an elastic mat of mineral fibers.

9. A compensator structure for compensating thermal expansions of adjacent in line sections of a pipeline (10) conveying hot flowing media in systems for the manufacture of cement clinker, said pipeline (10) having a sheet-steel jacket (15) and a refractory lining with an expansion gap (19) between said adjacent in-line sections which is filled by an elastic temperature-stable jointing material (20), comprising:

a corrugated pipe compensator (18) encompassing said pipeline (10) having axially opposite ends, one of which is secured to one of said adjacent in-line sections of said pipeline (10) and a plurality of circumferentially arranged jacket parts (21) detachably connected to one another forming a collar encircling said gap (19), said collar having a first axial end detachably secured to the other of said opposite ends of said corrugated pipe compensator (18) and having a second axially end detachably connected to the other of said in-line sections of said pipeline, said expansion gap (19) being arranged in a pipeline cross-sectional plane that lies adjacent to a cross-sectional plane of the corrugated pipe compensator (18), upon detachment of said jacket parts (21) from one another, from said corrugated pipe compensator (18) and from said other of said sections of said pipeline, said elastic temperature-stable jointing material (20) is accessible from said pipeline.

* * * * *